United States Patent
Wang (10) Patent No.: US 9,760,493 B1
(45) Date of Patent: Sep. 12, 2017

(54) SYSTEM AND METHODS OF A CPU-EFFICIENT CACHE REPLACEMENT ALGORITHM

(71) Applicant: VMware, Inc., Palo Alto, CA (US)

(72) Inventor: Wenguang Wang, Santa Clara, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 15/069,389

(22) Filed: Mar. 14, 2016

(51) Int. Cl.
| G06F 12/12 | (2016.01) |
| G06F 12/0868 | (2016.01) |
| G06F 12/121 | (2016.01) |
| G06F 12/122 | (2016.01) |
| G06F 12/127 | (2016.01) |

(52) U.S. Cl.
CPC .......... G06F 12/0868 (2013.01); G06F 12/12 (2013.01); G06F 12/121 (2013.01); G06F 12/122 (2013.01); G06F 12/127 (2013.01); G06F 2212/1021 (2013.01); G06F 2212/281 (2013.01); G06F 2212/608 (2013.01)

(58) Field of Classification Search
CPC ...... G06F 12/12; G06F 12/121; G06F 12/122; G06F 12/127
USPC .................................................. 711/159–160
See application file for complete search history.

(56) References Cited

U.S. PATENT DOCUMENTS

| 2008/0155183 | A1* | 6/2008 | Zhuang | G06F 12/0246 711/103 |
| 2012/0054445 | A1* | 3/2012 | Swart | G06F 12/0888 711/133 |
| 2012/0054447 | A1* | 3/2012 | Swart | G06F 12/0888 711/136 |
| 2015/0026412 | A1* | 1/2015 | Eads | G06F 17/30902 711/135 |

OTHER PUBLICATIONS

Johnson et al., "2Q: A Low Overhead High Performance Buffer Management Replacement Algorithm," Proceedings of the 20th VLDB Conference, Santiago, Chile, 1994, pp. 439-450.

* cited by examiner

*Primary Examiner* — Than Nguyen
(74) *Attorney, Agent, or Firm* — Patterson & Sheridan LLP (57) ABSTRACT

A method of updating a cache data structure that includes first, second, and third queues includes the step of storing contents of a data item in a cache location in response to a read or write input/output operation (IO) that accesses the data item. If the data item is not tracked in any of the first, second, and third queues, the data item is added to the first queue with the cache location of the data item. On the other hand, if the data item is tracked in the second queue, the data item is added to the third queue with the cache location of the data item.

20 Claims, 6 Drawing Sheets

SYSTEM AND METHODS OF A CPU-EFFICIENT CACHE REPLACEMENT ALGORITHM

BACKGROUND

Conventionally, a cache used for rapid access to recently used data uses a Least Recently Used (LRU) algorithm. In the LRU cache, whether a desired data item is present in the cache is determined by reference to a hash table. If a desired data item is found in the cache (cache hit), the LRU value of the data item to the current LRU count. More specifically, because the LRU cache is sorted by LRU value, the cache hit data item is moved from the existing spot in the cache to the top of the cache.

If a desired data item is not in the cache, i.e., a cache miss, the data item is retrieved from a storage device for use by the requesting application, and the data item is also added to the top of the cache (i.e., assigned current LRU value). The oldest data item (lowest LRU value) is evicted from the bottom of the cache.

The LRU cache is commonly used because it is relatively easy to implement. However, the LRU cache becomes polluted with a sequential scan. Further, the LRU cache cannot take advantage of multi-core processing. Moreover, the LRU cache requires substantial CPU overhead in the case of a cache hit, and it requires a large amount of memory to maintain cache entries ordered by the LRU value.

Another known cache algorithm is the Low Inter-reference Recency Set (LIRS), which uses a modified LRU cache and is more resistant to being polluted by a sequential scan compared to the basic LRU cache. However, LIRS is more complex to implement compared to the basic LRU cache, and therefore has a higher CPU overhead. LIRS also has higher memory usage overhead for a cache hit, and cannot take advantage of multi-core processing.

Another known cache algorithm is the Adaptive Replacement Cache (ARC) from IBM. However, ARC is also more complex to implement compared to the basic LRU cache, and therefore ARC also has a relatively high CPU overhead. The ARC also has a relatively high memory usage overhead for a cache hit, and cannot take advantage of multi-core processing.

Another known cache algorithm is 2Q, first described in a VLDB conference paper in 1994. The 2Q algorithm is scan friendly and relatively easy to implement. However, 2Q requires relatively high memory usage, and cannot take advantage of multi-core processing.

Another known cache algorithm is Clock, which approximates LRU but has low CPU overhead on cache hit and can take advantage of multi-core processing. However, it shares the same problem as LRU in that a sequential scan pollutes the cache.

Another known cache algorithm is ClockPro, which approximates LIRS but has low CPU overhead on cache hit and can take advantage of multi-core processing. However, it is more complex to implement.

Another known cache algorithm is Clock with Adaptive Replacement (CAR), which approximates ARC but has low CPU overhead on cache hit and can take advantage of multi-core processing. However, it is more complex to implement.

What is desired is a cache algorithm that is scan friendly, is relatively easy to implement, has low CPU overhead on cache hit, can take advantage of multi-core processing, and does not require a high memory usage.

DETAILED DESCRIPTION

Figure 1:
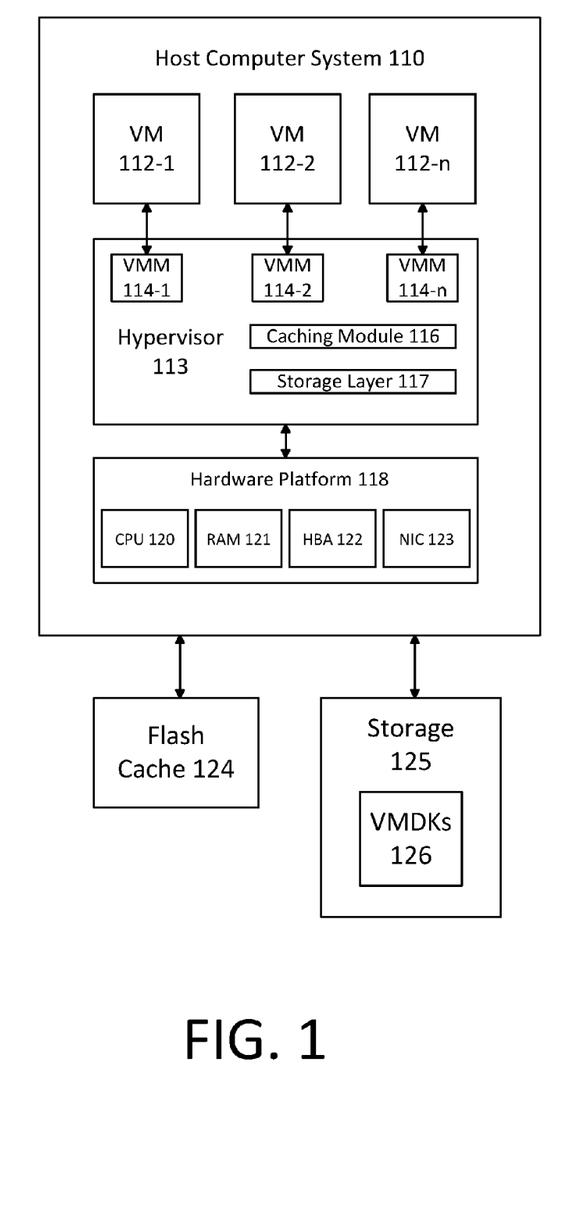
FIG. 1 depicts a block diagram of a computer system in which embodiments may be practiced.

FIG. 1 depicts a block diagram of a computer system in which embodiments may be practiced. The particular example illustrated in FIG. 1 is a host computer system (host) 110 for virtual computing instances in which a hypervisor 113 supports execution of the virtual computing instances, but embodiments may be practiced in other types of computer systems, e.g., a computer system with a conventional operating system that supports execution of applications. In the example illustrated in FIG. 1, the virtual computing instances executed in host 110 are virtual machines (VMs) 112-1, 112-2, and 112-n. Other examples of virtual computing instances include containers that do not employ an operating system.

As depicted in FIG. 1, host 110 includes hypervisor 113 as a virtualization software layer. Hypervisor 113 is installed on top of hardware platform 118 of host 110. Hypervisor 113 supports a virtual machine execution space within which one or more VMs 112 may be concurrently instantiated and executed. The hypervisor 113 includes virtual machine monitors (VMM) 114-1, 114-2 and 114-n for managing communications and operations with respect to each of the VMs 112-1, 112-2 and 112-n, respectively. Hardware platform 118 includes conventional components of a computer system, including, for example, one or more central processing units (CPU) 120, system memory (e.g., dynamic random access memory (RAM)) 121, one or more host bus adapters (HBA) 122, one or more network interface controllers (NIC) 123. In one embodiment, hypervisor 113 is an ESXi™ hypervisor, commercially available from VMware, Inc. of Palo Alto, Calif.

During use, VMs 112 issue input-output operations (IOs) to their respective virtual disks, which are provisioned in connected storage 125 as virtual machine disk files (shown as VMDKs 126). Hypervisor 113, through its storage layer 117, translates the IOs from the VMs into IOs that target one or more storage blocks representing the virtual machine disk file corresponding to issuing VM's virtual disk. Hypervisor 113 also includes a caching module 116 that employs a reserved area in system memory 121 and/or a flash cache 124 to cache the read data and write data associated with the IOs issued by hypervisor 113.

In one embodiment, storage 125 is remote to host 110, and accessed over an IP network as network-attached storage, a storage area network (SAN), or a virtual SAN, and flash cache 124 is connected locally to host 110 and includes storage devices, such as flash memory, that have lower IO latency compared to storage 125. In another embodiment, flash cache 124 is remote to host 110 and shared among a plurality of hosts.

Figure 2:
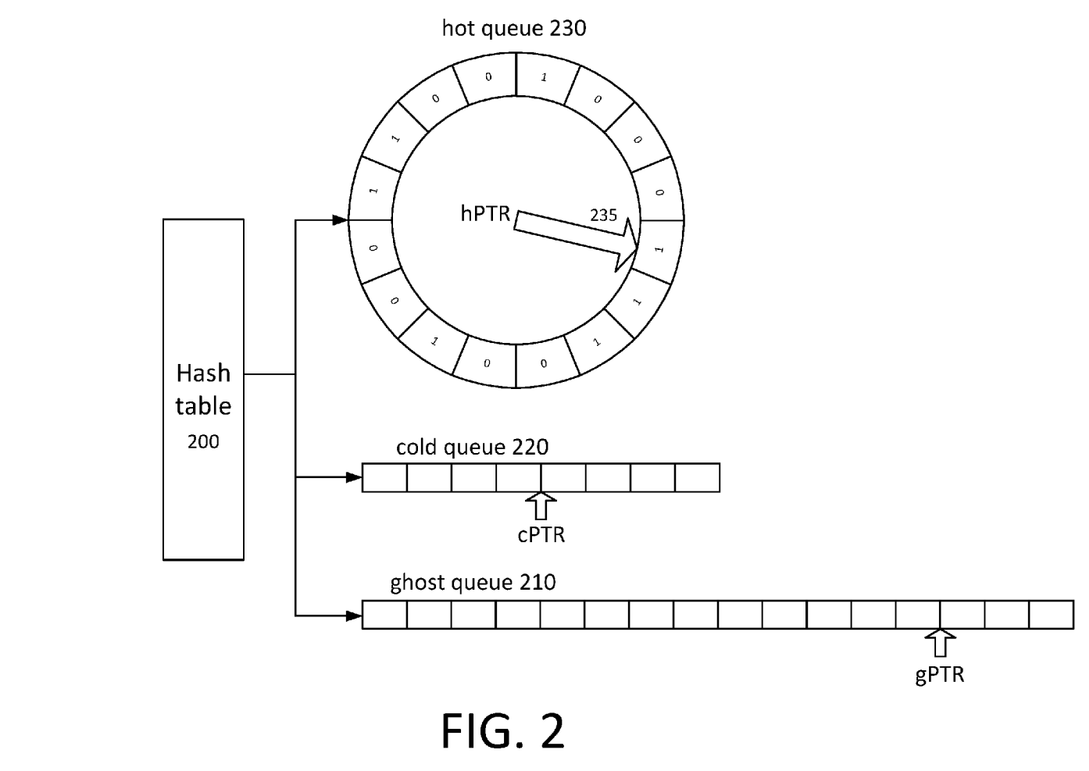
FIG. 2 depicts an example of a cache management data structure according to embodiments.

FIG. 2 depicts an example of a cache management data structure according to embodiments. The cache data management structure depicted herein is maintained in system memory 121 and represents the cache data structure for (i) a buffer cache that is maintained in system memory 121, (ii) flash cache 124, or (iii) any other caches known in the art. The cache data structure includes a hash table 200, a ghost queue 210, a cold queue 220, and a hot queue 230.

Hash table 200 includes entries that are indexed according to a hash of a logical block address (LBA), where the LBA represents the target location for an issued IO. Each entry of hash table 200 includes an LBA of a previously issued IO whose contents are currently cached or recently evicted, and a pointer to a location in one of the queues where the LBA is stored. The LBAs of currently cached contents are stored in either cold queue 220 or hot queue 230, and the LBAs of recently evicted contents are stored in ghost queue 210. Each LBA stored in cold queue 220 and hot queue 230 is also stored with a pointer to locations in the buffer cache or flash cache 124 ("cached data location") where the corresponding contents are stored. Ghost queue 210 only stores LBAs for recently evicted contents, and does not store any pointers to locations in the buffer cache or the flash cache 124.

As depicted in FIG. 2, hot queue 230 is configured as a ring buffer that includes a plurality of storage locations that are accessed for writes in a circular manner using a pointer hPTR. Each storage location of hot queue 230 has a reference bit associated therewith, and the reference bit is set to either 0 or 1. A reference bit of 0 indicates that the corresponding storage location has not been used recently. A reference bit of 1 indicates that the corresponding storage location has been used recently. Before a data item is written into a storage location of hot queue 230, an available storage location is searched for, beginning at the storage location referenced by the pointer hPTR. The pointer hPTR is advanced one storage location at a time and each time the pointer hPTR is advanced, the reference bit of the storage location that the pointer hPTR advanced from is set to 0 so as to ensure that the pointer hPTR can find an available storage location after one revolution. If a storage location having a reference bit of 0 is found, the data item is stored in that location. In the embodiments, the data item of hot queue 230 includes an LBA and a pointer to a location within the cache where the data corresponding to the LBA is stored.

Cold queue 220 is configured as a conventional FIFO (first-in, first out) buffer. FIG. 2 depicts a pointer cPTR of cold queue 220, which represents the next storage location into which a data item for cold queue 220 is to be written. In the embodiments, the data item of cold queue 220 includes an LBA and a pointer to a location within the cache where the data corresponding to the LBA is stored.

Ghost queue 210 is configured as a conventional FIFO (first-in, first out) buffer with one modification. In ghost queue 210, data items can be evicted from any storage location of ghost queue 210. FIG. 2 depicts a pointer gPTR of ghost queue 210, which represents the next storage location into which a data item for ghost queue 210 is to be written. In the embodiments, the data item of ghost queue 220 includes just an LBA.

In one embodiment, the size of hot queue 230 is three times the size of cold queue 220, and the size of ghost queue 210 is two times the size of cold queue 220.

Figure 3:
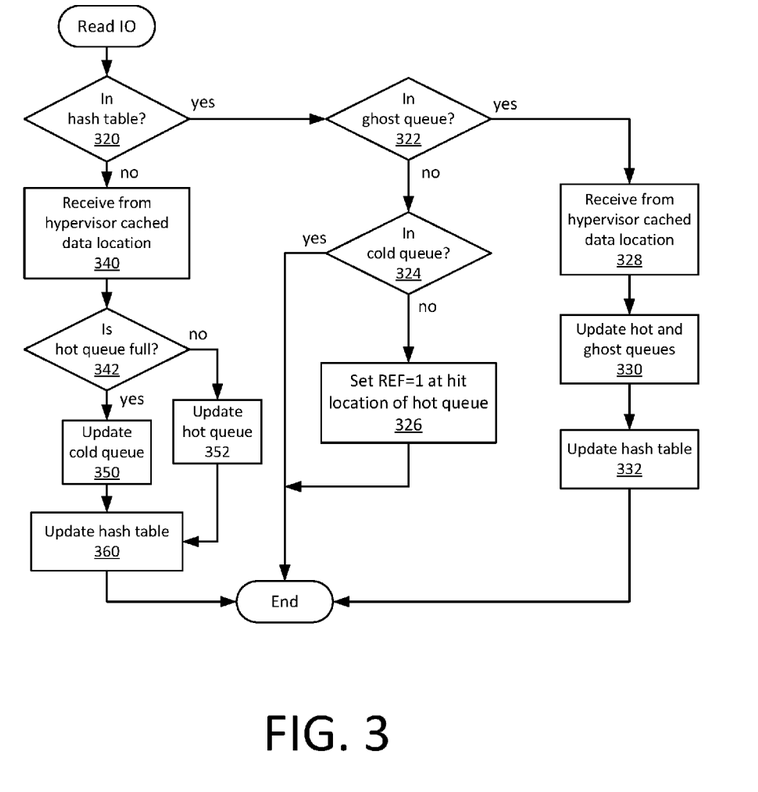
FIG. 3 depicts an example sequence of operations carried out according to embodiments when a read input/output operation is issued.

FIG. 3 depicts an example sequence of operations carried out by caching module 116 when a read IO is issued by hypervisor 113. When hypervisor 113 issues a read IO, caching module 116 accesses hash table 200 to determine if the LBA of the read IO is found in hash table 200 in step 320. If it is not (No in step 320), caching module 116 waits for hypervisor 113 to issue the read IO to storage 125 to retrieve the contents corresponding to the LBA from storage 125 and cache the contents in the buffer cache. When, in step 340, caching module 116 receives the cached data location from hypervisor 113, caching module 116 in step 342 checks to see if hot queue 230 is full. If so, caching module 116 updates cold queue 220 in step 350 (as described below in conjunction with FIG. 5) to add the LBA and the cached data location into cold queue 220. If hot queue 230 is not full, caching module 116 updates hot queue 230 in step 352 (as described below in conjunction with FIG. 4) to add the LBA and the cached data location into hot queue 230. Then, in step 360, caching module 116 updates hash table 200 to add an entry that includes the LBA and a pointer to a location in cold queue 220 or hot queue 230 where the LBA is stored. The process ends thereafter.

Returning to step 320, if the LBA of the read IO is found in hash table 200 (Yes in step 320), caching module 116 accesses the corresponding entry in hash table 200 to determine the current queue location of the LBA. If the LBA is stored in ghost queue 210 (Yes in step 322), steps 328, 330, and 332 are executed. If the LBA is not stored in ghost queue 210 (No in step 322) and is instead stored in cold queue 220 (Yes in step 324), no updates are made to the cache data structure and the process ends. If the LBA is stored in hot queue 210 (No in step 324), the reference bit associated with the storage location of hot queue 210 in which the LBA is stored is set to 1. The process ends thereafter.

Returning to step 322, if the LBA is stored in ghost queue 210 (Yes in step 322), caching module 116 waits for hypervisor 113 to issue the read IO to storage 125 to retrieve the contents corresponding to the LBA from storage 125 and cache the contents in the buffer cache. When, in step 328, caching module 116 receives the cached data location from hypervisor 113, caching module 116 in step 330 updates hot queue 230 (as described below in conjunction with FIG. 4) to add the LBA and the cached data location into hot queue 230 and updates ghost queue 210 to remove the LBA from ghost queue 210. Then, in step 332, caching module 116 updates hash table 200 to update the entry for the LBA so that it now points to a location in hot queue 230. The process ends thereafter.

Figure 4:
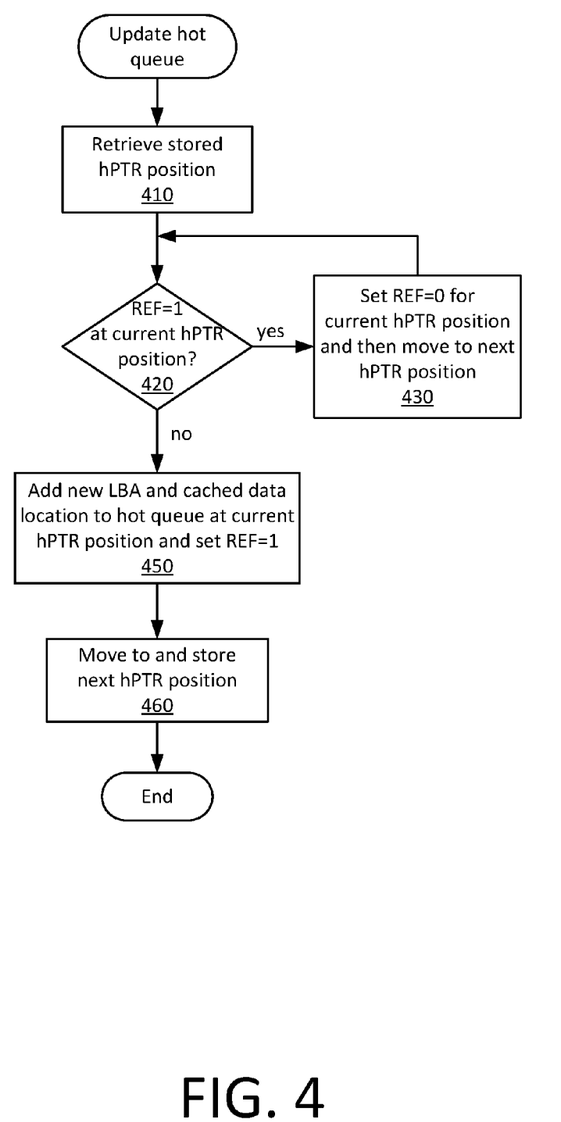
FIG. 4 depicts an example sequence of operations carried out to update a hot queue when a data item is accessed in a read or a write.
Figure 7:
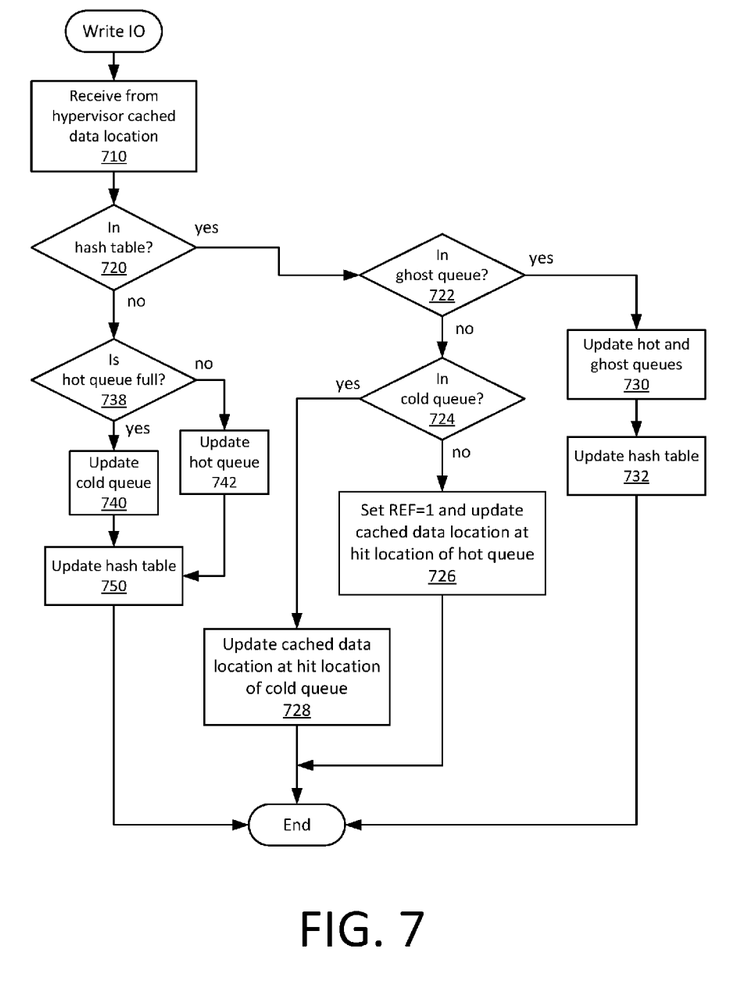
FIG. 7 depicts an example sequence of operations carried out according to embodiments when a write input/output operation is issued.

FIG. 4 depicts an example sequence of operations carried out by caching module 116 to update hot queue 230 to add an LBA (new LBA) that is currently stored in ghost queue 210 when the LBA is accessed in a read IO (FIG. 3) or a write IO (FIG. 7). In step 410, caching module 116 retrieves the stored position of the pointer hPTR of hot queue 230. In steps 420 and 430, the pointer hPTR is advanced one storage location at a time (while setting the REF=0 for the immediately prior storage location) until a storage location with REF=0 is found. If the storage location with REF=0 is found (No in step 420), in step 450, the new LBA and the location in the buffer cache where the data corresponding to the new LBA is stored (cached data location), are stored as a data item in the storage location of hot queue 230 where REF=0 was found. In step 460, the pointer hPTR is advanced one storage location and that position of the pointer hPTR is stored.

Figure 5:
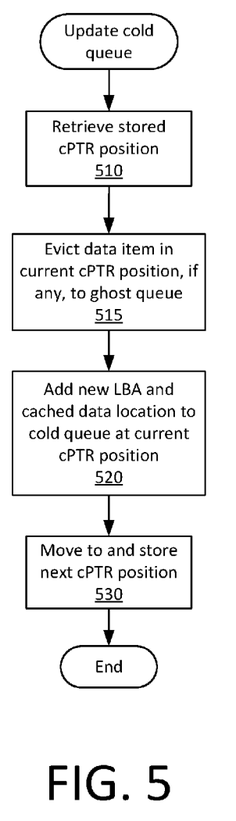
FIG. 5 depicts an example sequence of operations carried out to update a cold queue when a data item is accessed in a read or a write.

FIG. 5 depicts an example sequence of operations carried out by caching module 116 to update cold queue 230 to add an LBA (new LBA) to cold queue 230 when the LBA is accessed in a read IO (FIG. 3) or a write IO (FIG. 7). In step 510, caching module 116 retrieves the stored position of the pointer cPTR of cold queue 220. In step 515, the data item stored in the storage location currently referenced by the pointer cPTR of cold queue 220 is evicted to ghost queue 230 (as described below in conjunction with FIG. 6). If there is no such data item, step 515 is skipped. In step 520, the new LBA is stored as a data item in the storage location currently referenced by the pointer cPTR of cold queue 220. Then, in step 530, the pointer cPTR is advanced one storage location and that position of the pointer cPTR is stored.

Figure 6:
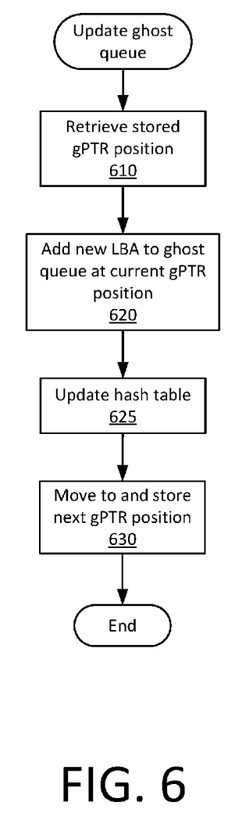
FIG. 6 depicts an example sequence of operations carried out to update a ghost queue when a data item is evicted from the cold queue.

FIG. 6 depicts an example sequence of operations carried out by caching module 116 to update ghost queue 230 to add an LBA (new LBA) that is evicted from cold queue 220 as described above in conjunction with FIG. 5. In step 610, caching module 116 retrieves the stored position of the pointer gPTR of ghost queue 210. In step 620, the new LBA is stored as a data item in the storage location currently referenced by the pointer gPTR of ghost queue 210. In step 625, caching module 116 updates hash table to update the entry for the LBA so that it now points to a location in ghost queue 210. Then, in step 630, the pointer gPTR is advanced one storage location and that position of the pointer gPTR is stored.

FIG. 7 depicts an example sequence of operations carried out by caching module 116 when a write IO is issued by hypervisor 113. When hypervisor 113 issues a write IO, caching module 116 waits for hypervisor 113 to cache the write data in the buffer cache. When, in step 710, caching module 116 receives the cached data location from hypervisor 113, caching module 116 accesses hash table 200 to determine if the LBA of the write IO is in hash table 200 in step 720. If it is not (No in step 720), caching module 116 in step 738 checks to see if hot queue 230 is full. If so, caching module 116 updates cold queue 220 in step 740 (as described above in conjunction with FIG. 5) to add the LBA and the cached data location into cold queue 220. If hot queue 230 is not full, caching module 116 updates hot queue 230 in step 742 (as described below in conjunction with FIG. 4) to add the LBA and the cached data location into hot queue 230. Then, in step 750, caching module 116 updates hash table 200 to add an entry that includes the LBA and a pointer to a location in cold queue 220 or hot queue 230 where the LBA is stored. The process ends thereafter.

Returning to step 720, if the LBA of the write IO is found in hash table 200 (Yes in step 720), caching module 116 accesses the corresponding entry in hash table 200 to determine the current queue location of the LBA. If the LBA is stored in ghost queue 210 (Yes in step 722), steps 730 and 732 are executed. If the LBA is not stored in ghost queue 210 (No in step 722) and is instead stored in cold queue 220 (Yes in step 724), cold queue 220 is updated to reflect the new cached data location for the LBA and the process ends. If the LBA is stored in hot queue 210 (No in step 724), hot queue 230 is updated to reflect the new cached data location for the LBA and the reference bit associated with the storage location of hot queue 210 in which the LBA is stored is set to 1. The process ends thereafter.

Returning to step 722, if the LBA is stored in ghost queue 210 (Yes in step 722), caching module 116 in step 730 updates hot queue 230 (as described above in conjunction with FIG. 4) to add the LBA of the write IO and the cached data location into hot queue 230 and updates ghost queue 210 to remove the LBA from ghost queue 210. Then, in step 732, caching module 116 updates hash table 200 to update the entry for the LBA so that it now points to a location in hot queue 230. The process ends thereafter.

As described above, LBA of data newly cached are added on a FIFO basis to cold queue 220. Items evicted from cold queue 220 are tracked in ghost queue 210. If an item tracked in ghost queue 210 is accessed by a read IO or a write IO, the item is moved to hot queue 230. Once an item is promoted to hot queue 230, each time the item is accessed, the reference bit is set to 1. Thus, an item is evicted from hot queue 230 only if it is not accessed before the pointer hPTR makes a full cycle.

Furthermore, management of the cache management data structure according to embodiments can be performed in parallel with multiple cores or multiple processors. Also, it should be recognized that a sequential scan will only pollute cold queue 220, but not hot queue 230. In addition, the cache management data structure according to embodiments has lower memory requirements and lower CPU overhead on cache hit than some of the prior art algorithms that are scan friendly and relatively easy to implement, such as the 2Q algorithm.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, solid state drive (SSD), non-volatile RAM (NVRAM), 3D xPoint, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing a cache of a computer system using a cache data structure that includes first, second, and third queues, the method comprising the steps of:
    storing contents of a first data item in a first cache location in response to a read or write input/output operation (TO) that accesses the first data item;
    upon determining that the first data item is not tracked in any of the first, second, and third queues, adding the first data item and the first cache location to the first queue;
    storing contents of a second data item in a second cache location in response to a read or write IO that accesses the second data item; and
    upon determining that the second data item is tracked in the second queue, adding the second data item and the second cache location to the third queue.

2. The method of claim 1, further comprising:
    if adding the first data item to the first queue causes an eviction of another data item in the first queue, adding the evicted data item to the second queue.

3. The method of claim 2, wherein data items are tracked with corresponding cache locations in the first and third queues, and data items are tracked in the second queue without corresponding cache locations.

4. The method of claim 3, wherein the third queue is larger in size than the first queue.

5. The method of claim 1, wherein the second data item is removed from the second queue upon being added to the third queue.

6. The method of claim 1, wherein the third queue is configured as a ring buffer that includes a plurality of storage locations, a bit associated with each storage location that indicates whether or not a data item in the corresponding storage location is allowed to be removed, and a pointer that scans the bits of the storage locations in a circular manner until a bit that indicates the data item in the corresponding storage location is allowed to be removed is found.

7. The method of claim 6, wherein a first bit value indicates that the data item in the corresponding storage location is not allowed to be removed from the third queue and a second bit value indicates that the data item in the corresponding storage location is allowed to be removed from the third queue, and the pointer sets each bit that is scanned to have the first bit value, to the second bit value.

8. The method of claim 7, wherein a bit associated with a data item that is tracked in the third queue is set to the first bit value when the data item is accessed in the read or write IO.

9. A non-transitory computer readable medium storing instructions that are executable in a computer system to cause the computer system to perform a method of managing a cache of the computer system using a cache data structure that includes first, second, and third queues, the method comprising the steps of:

storing contents of a first data item in a first cache location in response to a read or write input/output operation (TO) that accesses the first data item;

upon determining that the first data item is not tracked in any of the first, second, and third queues, adding the first data item and the first cache location to the first queue;

storing contents of a second data item in a second cache location in response to a read or write IO that accesses the second data item; and     upon determining that the second data item is tracked in the second queue, adding the second data item and the second cache location to the third queue.

10. The non-transitory computer readable medium of claim 9, wherein the method further comprises:

if adding the first data item to the first queue causes an eviction of another data item in the first queue, adding the evicted data item to the second queue.

11. The non-transitory computer readable medium of claim 10, wherein data items are tracked with corresponding cache locations in the first and third queues, and data items are tracked in the second queue without corresponding cache locations.

12. The non-transitory computer readable medium of claim 11, wherein the third queue is larger in size than the first queue.

13. The non-transitory computer readable medium of claim 9, wherein the second data item is removed from the second queue upon being added to the third queue.

14. The non-transitory computer readable medium of claim 9, wherein the third queue is configured as a ring buffer that includes a plurality of storage locations, a bit associated with each storage location that indicates whether or not a data item in the corresponding storage location is allowed to be removed, and a pointer that scans the bits of the storage locations in a circular manner until a bit that indicates the data item in the corresponding storage location is allowed to be removed is found.

15. The non-transitory computer readable medium of claim 14, wherein a first bit value indicates that the data item in the corresponding storage location is not allowed to be removed from the third queue and a second bit value indicates that the data item in the corresponding storage location is allowed to be removed from the third queue, and the pointer sets each bit that is scanned to have the first bit value, to the second bit value.

16. The non-transitory computer readable medium of claim 15, wherein a bit associated with a data item that is tracked in the third queue is set to the first bit value when the data item is accessed in the read or write IO.

17. A computer system comprising:

a processor;

a system memory; and a non-volatile storage device, wherein the processor is programmed to cache data of input/output operations (IOs) in one of the system memory and the non-volatile storage device and to maintain a cache data structure that includes first, second, and third queues, by carrying out the steps of:

storing contents of a first data item in a first cache location in response to a read or write input/output operation (TO) that accesses the first data item;

upon determining that the first data item is not tracked in any of the first, second, and third queues, adding the first data item and the first cache location to the first queue;

storing contents of a second data item in a second cache location in response to a read or write IO that accesses the second data item; and     upon determining that the second data item is tracked in the second queue, adding the second data item and the second cache location to the third queue.

18. The computer system of claim 17, wherein the steps further comprise:

if adding the first data item to the first queue causes an eviction of another data item in the first queue, adding the evicted data item to the second queue.

19. The computer system of claim 18, wherein data items are tracked with corresponding cache locations in the first and third queues, and data items are tracked in the second queue without corresponding cache locations.

20. The computer system of claim 19, wherein the third queue is larger in size than the first queue.

\* \* \* \* \*